July 14, 1970  D. M. MacMILLAN  3,520,025
TIRE RETREAD MATRIX MOLD WITH TAPERED LOCK HEATER RING
Filed Sept. 29, 1965  3 Sheets-Sheet 1

DONALD M. MacMILLAN
(deceased) INVENTOR
KENNETH T. MacMILLAN, EXECUTOR

BY
Mason, Porter, Diller & Brown
ATTORNEYS

July 14, 1970 D. M. MacMILLAN 3,520,025
TIRE RETREAD MATRIX MOLD WITH TAPERED LOCK HEATER RING
Filed Sept. 29, 1965 3 Sheets-Sheet 2
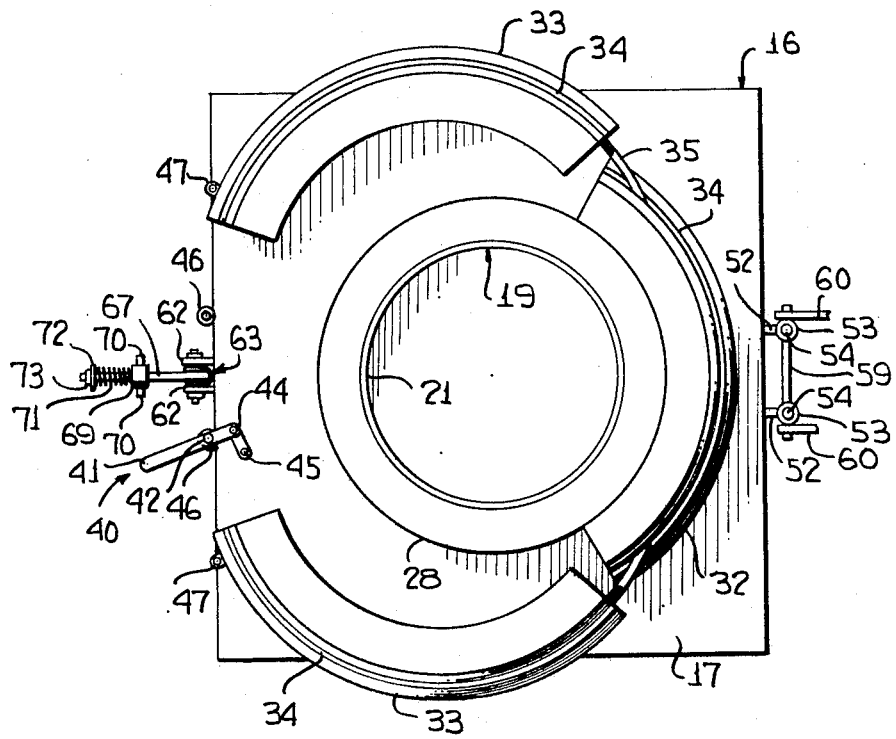
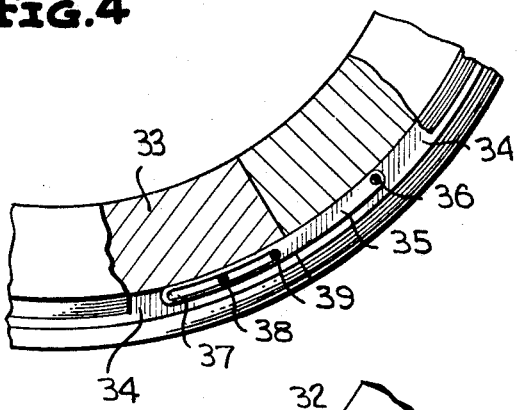
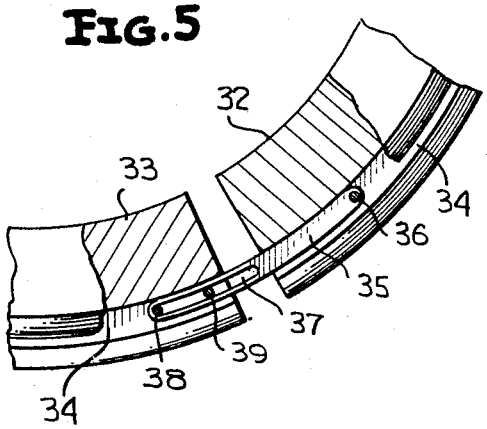
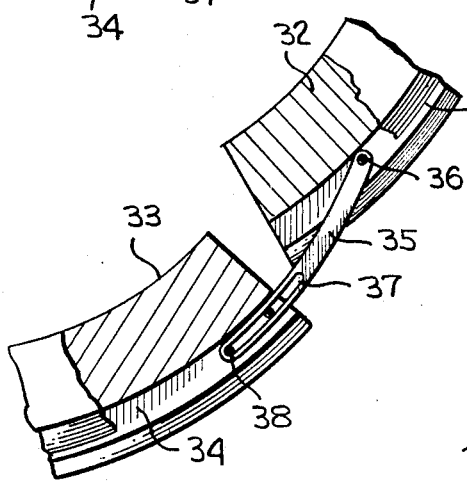
DONALD M. MACMILLAN
(deceased) INVENTOR
KENNETH T. MACMILLAN, EXECUTOR
BY
*Mason, Porter, Diller & Brown*
ATTORNEYS July 14, 1970  D. M. MacMILLAN  3,520,025
TIRE RETREAD MATRIX MOLD WITH TAPERED LOCK HEATER RING
Filed Sept. 29, 1965  3 Sheets-Sheet 3
FIG. 7
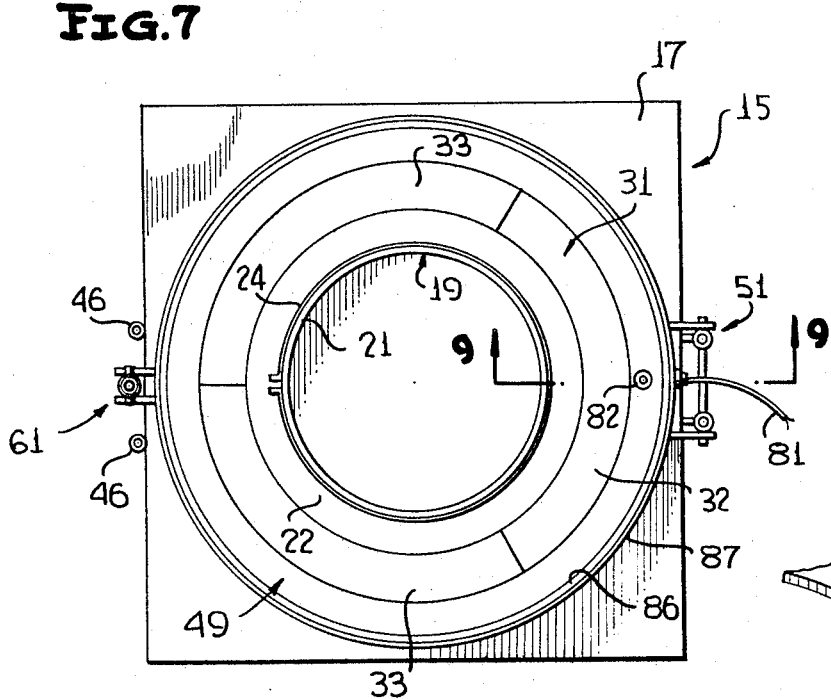
FIG. 10
FIG. 8
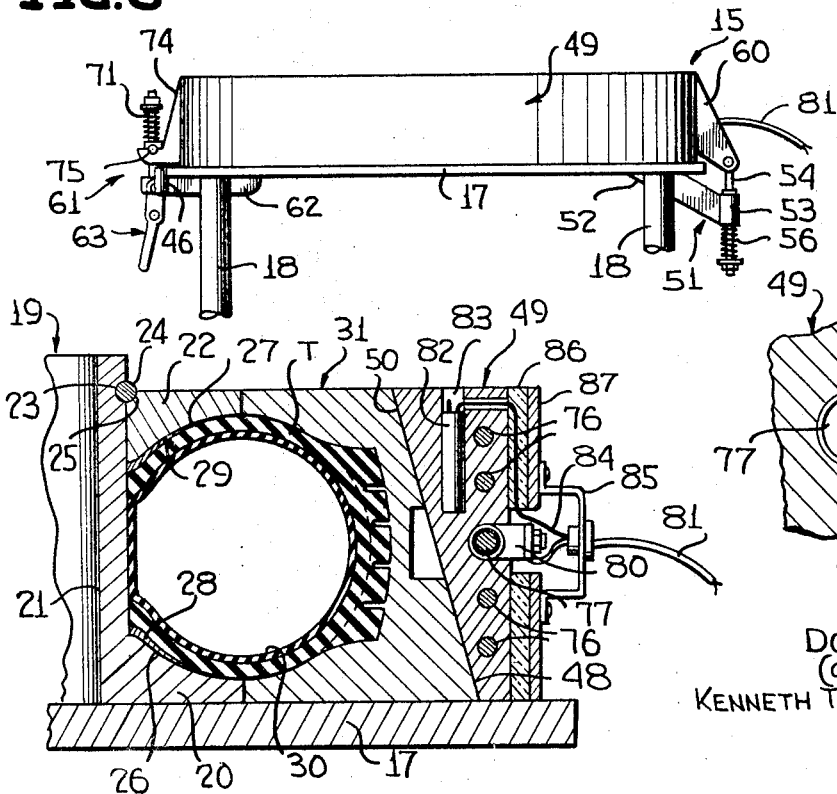
FIG. 11
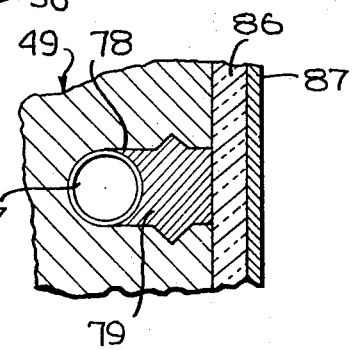
FIG. 9
DONALD M. MACMILLAN
(deceased) INVENTOR
KENNETH T. MACMILLAN, EXECUTOR
BY
Mason, Porter, Diller & Brown
ATTORNEYS 3,520,025
Patented July 14, 1970

3,520,025
TIRE RETREAD MATRIX MOLD WITH TAPERED LOCK HEATER RING
Donald M. MacMillan, deceased, late of Macon, Ga., by Kenneth T. MacMillan, executor, 4992 Wesleyan Woods Drive, Macon, Ga. 31204
Filed Sept. 29, 1965, Ser. No. 492,989
Int. Cl. B29h 5/02
U.S. Cl. 18—18      4 Claims

ABSTRACT OF THE DISCLOSURE

This disclosure relates to a matrix mold for use in tire treading operations and including a horizontally disposed, radially split matrix which is swingable to an open position to facilitate the insertion and removal of a tire relative thereto and to a fixed curing rim, and a continuous heater ring which is swingable from a horizontal position to a vertical position and which heater ring has surfaces which are tapered and which mate with like surfaces of the matrix to permit the heater ring to automatically lock the matrix in a closed position. The curing rim cooperates with the matrix to completely confine a tire being cured and is of a construction so as to facilitate the use of a conventional inner tube and the curing tube.

---

This invention relates in general to new and useful improvements in apparatus for retreading tires, and more specifically relates to a novel matrix mold construction.

A desired feature for matrix molds used in tire retreading operations is ease of placing the tire within the matrix mold and the removal of the cured retreaded tire therefrom. With this in view, it is proposed to provide a novel matrix mold wherein a sectional matrix is mounted on a generally horizontal support, and the sections thereof are hingedly connected together so that the matrix mold may be readily opened and closed to facilitate the positioning and removal of a tire from therewithin, and there being associated with the matrix a heater ring which, when it is in its operative position, engages the sectional matrix and both furnishes the necessary curing heat to the sectional matrix and locks the sectional matrix in its closed position.

Another object of the invention is to provide a novel matrix mold for retreading tires, the matrix mold including a base having a generally horizontal support, a sectional matrix seated on the support with the sections of the matrix being hingedly connected together for swinging movement on the support to facilitate the positioning and removal of a tire relative to the matrix, the base carrying a tool which is engageable with sections of the matrix to facilitate the opening and closing of the matrix, and there additionally being a heater ring which is pivotally mounted on the base for swinging movement between a generally horizontal operative position and a generally vertical inoperative position, the heater ring serving both to secure the matrix against opening and to furnish the necessary curing heat to the matrix.

Another object of the invention is to provide a novel curing rim construction which permits the use of a conventional inner tube as the curing tube, the curing rim including a lower flange which carries an upstanding circular band, and there being an upper flange which is telescoped on the band for vertical movement relative thereto, and the band being provided with a locking ring for limiting the upward movement of the upper flange.

Another object of the invention is to provide a novel matrix mold which includes a sectional matrix and a curing rim disposed generally in coplanar concentric relation, both the curing rim and the matrix being of channel shape in transverse section with the matrix and the curing rim being disposed in opposed closely spaced relation so that a tire being retreaded is substantially completely enclosed within the mold.

Still another object of the invention is to provide a novel matrix mold construction which includes a sectional matrix and a heater ring, the outer surface of the matrix and the inner surface of the heater ring having complementary tapers whereby the heater ring functions as a lock against the opening of the matrix, and the heater ring being formed of aluminum to faciliitate the transfer of heat therefrom to the matrix, the heater ring being reinforced by wires embedded within the aluminum metal thereof.

A further object of the invention is to provide a novel matrix mold construction which includes a suitable support on which a sectional matrix is seated, and there being also provided a heater ring which serves to both supply heat to the matrix and to lock the matrix against opening, the heater ring and the matrix having complementary tapered surfaces which are engaged when the heater ring is in a matrix locking position, and the heater ring being provided with resilient hold-downs which permit limited relative movement of the heater ring with respect to the matrix mold to compensate for expansion of both the matrix and the heater ring during a tire curing operation wherein the heater ring and the matrix are heated.

Yet another object of the invention is to provide in a matrix mold shims which are engaged with the beads and side walls of a tire being cured therein, the shims conforming to the particular make of tire so that beads and side walls of each tire are fully supported during the curing operation.

With the above, and other objects in view that will hereinafter appear, the nature of the invention will be more clearly understood by reference to the following detailed description, the appended claims, and the several views illustrated in the accompanying drawings:

In the drawings:

FIG. 3 is a plan view of the matrix mold, with the heater ring omitted and the matrix in an open position for the reception of a tire therein, the top flange and locking ring of the curing rim also being omitted.

FIG. 4 is an enlarged fragmentary plan view, with portions broken away and shown in section, of a juncture between two sections of the matrix and shows the specific details of a hinge connecting the two together.

FIG. 5 is a view similar to FIG. 4 and shows the matrix sections in a partially opened position.

FIG. 6 is another view similar to FIG. 4, and shows the matrix sections in opened and pivoted apart positions with respect to each other.

FIG. 7 is a plan view of the completely assembled matrix mold, with the heater ring in its matrix locking position.

FIG. 8 is a fragmentary side elevational view of the matrix mold of FIG. 7.

FIG. 9 is an enlarged fragmentary vertical sectional view taken substantially along the line 9—9 of FIG. 7, and shows the specific relationships of the various components of the matrix mold, the details of the hinge for the heater ring being omitted for purposes of clarity.

FIG. 10 is an enlarged fragmentary perspective view of a portion of one of the shims.

FIG. 11 is an enlarged fragmentary vertical sectional view taken through the heater ring and shows the manner in which the heating element thereof is mounted therein.

Figure 1:
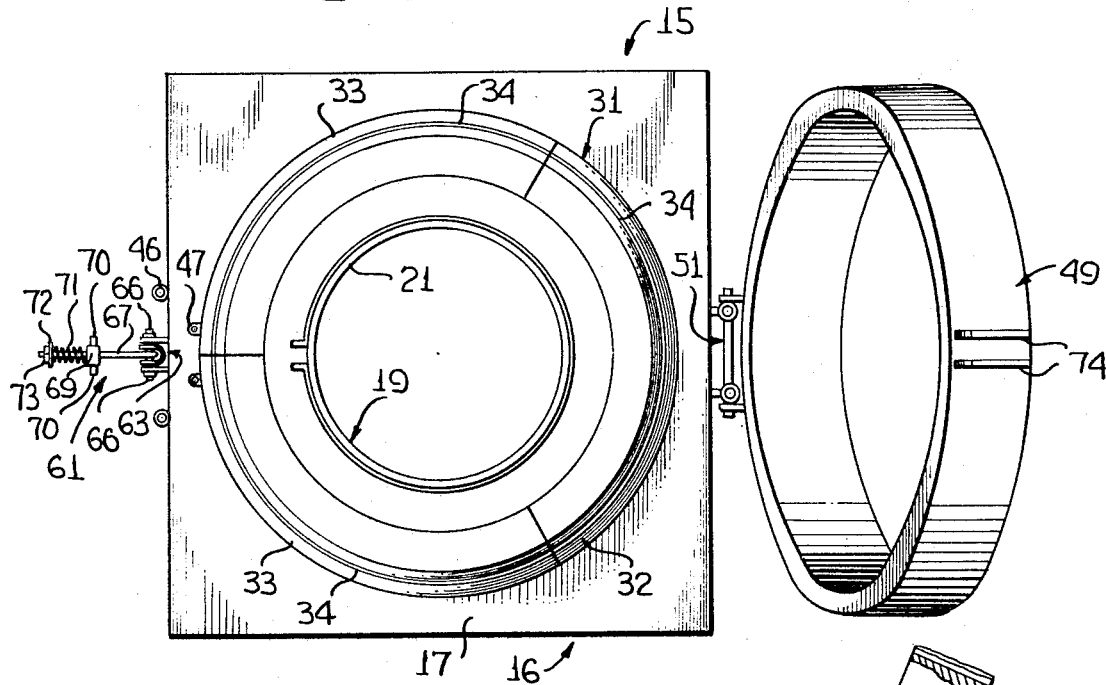
FIG. 1 is a plan view of the matrix mold, with the heater ring thereof in an open or inoperative position.
Figure 2:
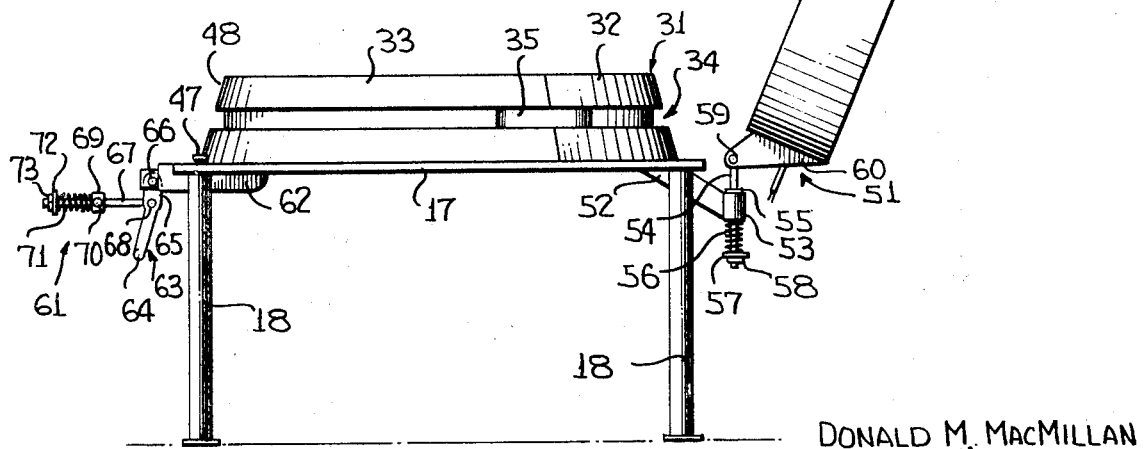
FIG. 2 is a side elevational view of the matrix mold of FIG. 1, and shows further the details thereof.

Referring now to the drawings in detail, it will be seen that there is illustrated the matrix mold which is the subject of this invention, the matrix mold being generally referred to by the numeral 15. The matrix mold 15 includes a suitable base, generally referred to by the numeral 16. The base 16, as is best illustrated in FIGS. 1 and 2, includes an upper support 17 in the form of a generally square plate and a plurality of supporting legs 18. However, it will be readily apparent that the structure of the base 16 may be modified as is found necessary to properly support the various structural elements of the matrix mold.

A curing rim, generally referred to by the numeral 19, is centrally positioned on the support 17. The curing rim 19, as is best shown in FIG. 9, includes a bottom flange 20 which carries an upstanding circular band 21. An upper flange 22 is telescoped over the upper portion of the band 21 and is slidable thereon for removal therefrom. An annular recess 23 is formed in the upper outer surface portion of the band 21 and a locking ring 24 is positioned therein to restrict the upward movement of the flange 22. If desired, the flange 22 may also be recessed, as at 25, to receive a portion of the locking ring 24.

It is to be understood that the curing rim 19 is to be rigidly secured to the support 17. The flanges 20 and 22 have opposed surfaces 26 and 27, respectively, which conform generally to the bead and side wall portions of a tire. However, since the bead and side wall configuration of tires varies even in a particular size of tire from one manufacturer to another, the surfaces 26 and 27 cannot conform to the bead and side wall configurations of all tires. In view of this, the curing rim 19 is also provided with replaceable shims 28 and 29 which seat on the surfaces 26 and 27, respectively. Through the use of the shims 28, 29, which shims will be provided in sets for the various makes of tires, the beads and side walls of a tire may be properly supported during the curing operation. A typical tire is illustrated in FIG. 9, and is referred to by the letter T. A portion of one of the shims 28 is illustrated in FIG. 10 so as to show the annular configuration thereof.

It is necessary that the tire T be inflated or expanded during the curing operation. To this end, there is normally provided a curing tube. However, the details of the curing rim 19 are such that an ordinary inner tube, illustrated in FIG. 9 and referred to by the numeral 30, may be utilized in lieu of the expensive curing tube.

Referring once again to FIG. 1 in particular, it will be seen that the matrix mold 15 also includes a matrix, generally referred to by the numeral 31, which is seated on the support 17 and is disposed generally coplanar and concentric with the curing rim 19. As is best illustrated in FIG. 9, the matrix 31 is of a channel shape in transverse section and is disposed in opposed relation to the generally channel-shaped curing rim 19. Further, the matrix 31 is aligned with the curing rim 19 and together with the curing rim 19 serves to substantially completely enclose a tire being cured as part of the retreading operation.

The matrix 31 includes a fixed matrix section 32 and a pair of openable matrix sections 33. The matrix section 32 is preferably removably, but rigidly, secured to the support 17 in a fixed position.

As is best illustrated in FIGS. 2 and 9, the matrix sections 32, 33 are provided with an annular groove 34 in the outer surface thereof. The annular groove 34 has seated therein hinge links 35 which serve to hingedly connect the matrix section 33 to the matrix section 32. This is best shown in FIGS. 4, 5 and 6.

Each hinge link 35 is elongated and is arcuate in plan, the curvature of the hinge link 35 corresponding generally to the curvature of the annular groove 34 in which it is seated. One end of the hinge link 35 is pivotally connected to the matrix section 32 by a vertically disposed pivot pin 36. The opposite end of the hinge link 35 is provided with an elongated slot 37 which extends longitudinally of the length of the hinge link 35. A pair of fixed pins 38 and 39 carried by the respective one of the matrix sections 33 are disposed within the slot 37. When the matrix sections 32 and 33 are in their closed positions, as is illustrated in FIG. 4, the pin 39 is disposed in the end of the slot 37 nearest the pivot pin 36. As is best shown in FIG. 5, during the opening operation, the matrix section 33 is permitted to slide away from the matrix section 32, with the pins 38 and 39 moving in the slot 37 until the pin 38 engages the end of the slot 37 remote from the hinge pin 36. The matrix section 33 and its associated hinge link 35 may then be pivoted with respect to the matrix section 32 about the pivot pin 36 to the relative position illustrated in FIG. 6 with respect to the matrix section 32. The relative positions of the matrix sections 32 and 33 of FIG. 6 correspond to that of FIG. 3, wherein the matrix 31 is in an open position ready to receive a tire to be cured. The tire T, with the inner tube 30 therein, is then dropped down over the band 21 and is seated on a shim 28 positioned on the lower flange 20 of the curing rim 19.

After the tire T has been initially positioned on the curing rim band 21, the shim 29 and the flange 22 are positioned above the tire, and the locking ring 24 is snapped in place. Then the matrix sections 33 are pulled towards each other so that the matrix sections 33 may assume the positions illustrated in FIG. 1.

In order to facilitate the opening and closing of the matrix 31, a tool, generally referred to by the numeral 40, is provided. The tool 40 is in the form of a lever 41 having a pin 42 disposed intermediate the ends thereof. A link 43 is pivotally connected to one end of the lever 41 by means of a pivot pin 44. The opposite end of the link 43 carries a pin 45.

A pair of vertically disposed sockets 46 are carried by the base 16, the sockets 46 being disposed on opposite sides of the centerline which extends between the mating surfaces of the matrix sections 33 when the matrix sections 33 are in their closed positions. The pin 42 of the tool 40 is selectively receivable in one of the sockets 46. Also, each of the matrix sections 33 is provided with a fitting 47 for receiving the pin 45. When the tool 40 is positioned in one of the sockets 46, the pin 45 is positioned in the fitting 47. The tool 40 is then actuated to either pull the matrix sections 33 together or to move the matrix sections 33 apart depending upon the phase of the operation. It is through the use of the tool 40 that the matrix sections 33 are moved to the position illustrated in FIG. 1 and are initially separated after the curing operation is completed.

As is best illustrated in FIGS. 2 and 9, the outer surface of the matrix 31 is tapered, as at 48. A heater ring, generally referred to by the numeral 49, is positioned over the closed matrix 31 and functions to lock the matrix 31 in its closed position. To this end, the heater ring has an inner surface 50 which is complementary to the surface 48 of the matrix 31. Thus, when the heater ring 49 is moved over the matrix 31, the complementary surfaces 48, 50 serve to further urge the matrix sections 32, 33 together to form a rigid matrix 31 which completely encases the tire T.

The heater ring 49 is mounted on the base 16 for swinging movement between a generally horizontal matrix locking position and a generally vertical inoperative or open position by means of a hinge structure generally referred to by the numeral 51 and best illustrated in FIG. 2. The hinge structure 51 includes a pair of support arms 52 which extend downwardly and rearwardly from the underside of the support 17. The support arms 52 terminate at their rear ends in vertically disposed sleeves 53. A pin 54, which is vertically disposed, passes through each of the sleeves 53. A stop collar 55 is positioned on the upper part of each pin 54 to limit the downward movement thereof through its respective sleeve 53. A coil spring 56 is positioned on the lower part of each pin 54 and abuts the underside of its respective sleeve 53. A washer 57 engages the underside of the spring 56 and the position of the washer 57 is adjusted by means of a nut 58 which is threadedly engaged on a threaded lower portion of the pin 54.

A hinge pin 59 extends between and is secured to the upper ends of the pins 54. The ends of the hinge pin 59 extend beyond the intersections thereof with the pins 54 and the hinge pin 59 passes through a pair of ears 60 secured to the outer periphery of the heater ring 49. Thus, the heater ring 49 is mounted for pivotal movement about the hinge pin 59, and the hinge pin 59 is mounted for resilient upward movement, with the upward movement thereof being resisted by the springs 56.

A latch assembly, generally referred to by the numeral 61, is provided for holding down the heater ring 49. The latch assembly 61 is carried by the base 16 remote from the hinge assembly 51. The latch assembly includes a pair of brackets 62 which are secured to the underside of the support 17 and project therebeyond. A lever 63 is supported by the brackets 62. The lever 63 includes a lower handle portion 64 and an upper bifurcated portion 65, which bifurcated portion 65 is pivotally connected to the brackets 62 by means of aligned pins 66.

A hold-down rod 67 is pivotally connected to the bifurcated portion 65 below the pin 66 by means of a pin 68. A latch block 69 is slidably positioned on the rod 67 and has pins 70 projecting from opposite sides thereof. Movement of the latch block 69 away from the lever 63 is resisted by a coil spring 71 which has one end thereof abutting the latch block 69 and the opposite end thereof abutting a washer 72 which is positioned by means of a nut 73 which is adjustably threadedly engaged on the rod 67 remote from the lever 63.

The outer surface of the heater ring 49 is provided with a pair of parallel keepers 74 which are generally aligned with the brackets 62. As is best shown in FIG. 8, the keepers 74 have upwardly opening sockets 75 in which the pins 70 of the latch bar 69 may be received.

In use, the heater ring 49 is swung down over the matrix 31. The lever 63 is then swung upwardly and the pins 70 engaged in the sockets 75. The lever 63 is then swung downwardly to a position illustrated in FIG. 8, at which time the spring 71 is partially compressed. It will thus be seen that the heater ring 49 is resiliently held in place by the coil springs 56 and 71.

Referring once again to FIG. 9, it will be seen that the heater ring 49 has a plurality of reinforcing wires 76 extending therethrough. The heater ring 49 is preferably formed of aluminum, so as to permit a maximum transfer of heat from the heater ring 49 into the matrix 31. It is also preferred that the matrix 31 be formed of aluminum, although other materials may be utilized. Since the heater ring 49 is placed under tension when it is clamped down over the matrix 31, it is necessary to reinforce the aluminum of the heater ring 49. It is for this reason that the wires 76 are embedded within the heater ring 49 at the time it is cast. The wires 76, if desired, may be prestressed so as to place the heater ring 49 under compression when it is remote from the matrix 31.

The heater ring 49 is electrically heated by means of a heating element 77 which is disposed within the heater ring 49. The heater ring 49 has the periphery thereof formed with a groove 78, as is best shown in FIG. 11, after which the heating element 77 is positioned within the bottom of the groove 78. The heating element 77 is retained in the groove 78 by a metal ring 79 which is cast within the groove 78 after the heating element 77 has been positioned therein.

The heating element 77 is provided with a suitable fitting 80 to which electric current supplying wires 81 are connected. There is also provided a temperature responsive control device 82 which is positioned within a bore 83 opening through the top of the heater ring. A wire 84 leads from the control device 82 and is connected to the wires 81 in any desired manner for effecting the controlling of the energization of the heating element 77. A suitable bracket 85 is provided for supporting the wires 81 and 84.

In order to reduce the dissipation of heat outwardly from the heater ring 49 to a minimum, a layer of insulation 86 is disposed about the outer periphery of the heater ring 49. A jacket 87 surrounds the insulation and retains it in place. The bracket 85 is secured to the jacket 87 in any desired manner.

It is to be understood that during the curing operation, the inner tube 30 is inflated. The tension of the coil springs 56 and 71 is such that the heater ring 49 is retained in place against the expanding force of the air pressure. However, when the matrix mold is heated, the metal of the heater ring 49 and the metal of the matrix 31 expand. In order to compensate for this expansion, it is necessary that the heater ring 49 move upwardly slightly on the matrix 31. The force required to effect this upward movement is sufficient to overcome the coil springs 56 and 71. However, although the heater ring 49 can move upwardly, the coil springs 56 and 71 will supply sufficient force to hold the heater ring 49 in the necessary matrix clamping position at all times, notwithstanding the fact that the heater ring 49 can move upwardly to compensate for expansion of the matrix 31 and the heater ring 49.

OPERATION

In the use of the matrix mold 15, the tire T to be retreaded is properly buffed, cement is applied thereto and a new uncured rubber camelback applied in the conventional manner. The inner tube 30 is then placed in the tire T. The tire is measured from the bead around the tire, sectionwise, to the other bead to determine the correct bead shims 28, 29 to be used. The tire and tube are then placed on the curing rim 19 with the top flange 22 and the shim 29 removed. The shim 29 and the flange 22 are then telescoped down over the band 21 of the curing rim 19, after which the flange 22 is locked in place against upward movement by the locking ring 24. The matrix 31 is then closed by pulling the matrix sections 33 together from the positions illustrated in FIG. 3 to the positions of FIG. 1. The heater ring 49 is now lowered from its elevated position of FIG. 2 to its matrix locking position of FIG. 8, and the latch assembly 61 is engaged in the manner illustrated in FIG. 8. The taper on the heater ring 49 forces the matrix 31 to contract about the tire, as is necessary. The inner tube 30 is now inflated with compressed air, after which the heating element 77 is energized to supply the necessary heat to the matrix 31 for the curing of the camelback.

After the tire has been cured, in order to remove the tire, it is necessary to first deflate the inner tube 30, after which the latch assembly 61 is released and the heater ring 49 is raised. The tool 40 is then used to open the matrix 31, after which the matrix sections 33 are pulled apart to the positions illustrated in FIG. 3, so that the tire and tube may be removed from the curing rim after the locking ring 24, the flange 22 and the shim 29 have been removed. The matrix mold is now ready to receive another tire for curing.

From the foregoing, it will be seen that novel and advantageous provision has been made for carrying out the desired end. However, attention is directed to the fact that variations may be made in the example apparatus disclosed herein without departing from the spirit and scope of the invention.

What is claimed is:

1. A mold for retreading tires comprising a base having a generally horizontal support, a sectional matrix seated on said support, hinge means connecting the matrix sections together for swinging movement in a plane generally parallel to said support and between open and closed positions, a heater ring for surrounding said sectional matrix and supplying heat thereto, and means mounting said heater ring for swinging movement about a generally horizontal pivot for movement between a generally horizontal operative position and a generally vertical open position, said matrix and said heater ring having tapered opposed complementary surfaces whereby said heater ring in its operative position automatically clamps together said matrix sections, said heater ring and said base having releasable cooperating hold-down means remote from said heater ring mounting means for locking said heater ring in its operative position.

2. A mold for retreading tires comprising a base having a generally horizontal support, a sectional matrix seated on said support, hinge means connecting the matrix sections together for swinging movement in a plane generally parallel to said support and between open and closed positions, a curing rim seated on said support within said matrix for cooperation with said matrix, a heater ring for surrounding said sectional matrix and supplying heat thereto, and means mounting said heater ring for swinging movement about a generally horizontal pivot for movement between a generally horizontal operative position and a generally vertical open position, said matrix and said heater ring having tapered opposed complementary surfaces whereby said heater ring in its operative position automatically clamps together said matrix sections, said curing rim including a first side wall and bead confining lower flange, a circular band rigidly carried by said first flange in upstanding relation, and a second side wall and bead confining upper flange releaseably telescoped over said band, an annular recess in said band remote from said first flange, and a locking ring partially seated in said recess and engaging said second flange to restrict movement of said second flange away from said first flange.

3. The mold of claim 1 wherein said hold-down means and said heater ring mounting means include resilient elements to permit movement of said heater as requried to copensate for expansion of said matrix and said heater ring.

4. The mold of claim 2 together with a conventional inner tube being used as a curing tube.

References Cited

UNITED STATES PATENTS

| | | | |
|---|---|---|---|
| 2,509,830 | 5/1950 | MacMillan | 18—18 |
| 2,730,764 | 1/1956 | James | 18—18 |
| 2,736,060 | 2/1956 | Glynn | 18—18 |
| 2,822,576 | 2/1958 | Rowe | 18—18 |
| 2,834,984 | 5/1958 | Robbins | 18—18 |
| 2,866,228 | 12/1958 | French | 18—18 |
| 3,042,966 | 7/1962 | Laycox | 18—18 X |
| 3,091,802 | 6/1963 | Rowls | 18—18 X |
| 3,130,446 | 4/1964 | Duerksen | 18—2 |
| 3,137,032 | 6/1964 | MacMillan | 18—18 X |
| 3,233,284 | 2/1966 | MacMillan | 18—18 X |
| 3,315,312 | 4/1967 | Larson | 18—18 |
| 2,567,985 | 9/1951 | Baker et al. | 18—18 |
| 2,675,582 | 4/1954 | Kent | 18—18 |
| 2,683,898 | 7/1954 | Glynn | 18—18 |
| 2,854,692 | 10/1958 | Robbins | 18—18 |
| 2,854,693 | 10/1958 | Robbins | 18—18 |
| 2,871,514 | 2/1959 | White | 18—18 |
| 2,267,243 | 12/1941 | MacMillan | 18—18 |
| 2,333,588 | 11/1943 | Schaevits | 18—18 |
| 2,372,216 | 3/1945 | MacMillan | 18—18 |
| 2,372,217 | 3/1945 | MacMillan | 18—18 |
| 2,372,644 | 4/1945 | Bacon | 18—18 |

J. HOWARD FLINT, Jr., Primary Examiner

U.S. Cl. X.R.

18—2, 38